US006663250B1

(12) United States Patent
Rada et al.

(10) Patent No.: US 6,663,250 B1
(45) Date of Patent: Dec. 16, 2003

(54) INTEGRATED VEHICLE DISPLAY LIGHTING ASSEMBLY

(75) Inventors: Mark Z. Rada, Kokomo, IN (US); Robert Martin Voto, Noblesville, IN (US); Christopher Timothy Tarte, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 4 days.

(21) Appl. No.: 10/061,691

(22) Filed: Feb. 1, 2002

(51) Int. Cl.⁷ .............................................. G01D 11/28
(52) U.S. Cl. ............................ 362/23; 362/24; 362/26; 362/29; 362/30; 362/31
(58) Field of Search .............................. 362/23, 24, 26, 362/29, 30, 31, 489

(56) References Cited

U.S. PATENT DOCUMENTS 6,286,972 B1 * 9/2001 Shepherd et al. ............. 362/86

* cited by examiner

*Primary Examiner*—Sandra O'Shea
*Assistant Examiner*—Bertrand Zeade
(74) *Attorney, Agent, or Firm*—Stefan V. Chmielewski

(57) ABSTRACT

A vehicle display assembly includes a display board, a light source for illuminating the display board, a plurality of buttons, and a grounding frame and housing which are both configured to allow light from the light source to illuminate the plurality of buttons. Using the same light source to illuminate both the display board and the buttons eliminates the need for separate button lighting, simplifying the assembly and reducing the assembly's operating temperature.

10 Claims, 3 Drawing Sheets

INTEGRATED VEHICLE DISPLAY LIGHTING ASSEMBLY

BACKGROUND OF THE INVENTION

1. Technical Field

The present invention is directed to vehicle display lighting, and more particularly to lighting systems that can illuminate multiple components in a vehicle display assembly.

2. Background of the Invention

Vehicle display assemblies often use a backlit liquid crystal display (LCD) so that the display can be viewed easily by the user. Fluorescent light is the most common backlight source for LCDs. To ensure that the display can be read in daytime ambient light, the display backlighting is relatively intense.

The display assemblies may also include buttons for operating, for example, a radio or CD player. Current assemblies illuminate each button with its own incandescent light source, providing backlighting and color for any graphics on the button. Each light source may include a colored boot to produce a desired light color for the button graphics.

As vehicles incorporate more features that require more buttons, the number of light sources also increases. The heat generated from incandescent lights, however, elevates the temperature of the buttons by as much as 20° C., enough to be noticeable by a user. Further, the increased temperature may place undesirable thermal stress on the display components. Thermal protection algorithms may be used to monitor the assembly temperature and reduce the light intensity if the temperature reaches a selected threshold until the temperature drops to an acceptable level, but these systems require additional, cumbersome circuitry for turning the button light sources on and off.

There is a need for a display assembly lighting system that can illuminate a main display and adjacent buttons while keeping the assembly temperature within a desirable range.

SUMMARY OF THE INVENTION

Accordingly, the present invention is directed to a vehicle display assembly, comprising a display board, a light source for illuminating the display board, a grounding frame containing the display board and the light source, and at least one button disposed outside the grounding frame, wherein the grounding frame is configured to allow light from the light source to illuminate said at least one button.

The invention is also directed to a vehicle display assembly, comprising a display board, a light source for illuminating the display board, a grounding frame containing the display board and the light source, a display housing that houses the display board, light source, and grounding frame, and a plurality of buttons disposed outside the display housing, wherein the grounding frame is formed without at least one side to allow light passage and the display housing is configured to allow light from the light source to illuminate the plurality of buttons.

Additional advantages and features of the invention will be apparent from the Figures and from the detailed description below.

BRIEF DESCRIPTION OF THE DRAWINGS

The present invention will now be described, by way of example, with reference to the accompanying drawings, in which.

DESCRIPTION OF THE EMBODIMENTS

In general, the inventive structure allows excess light from a navigation display's backlighting to illuminate additional nearby components, such as radio buttons and/or a CD slot. This structure eliminates the need for separate lighting for the display and for the components.

Figure 1:
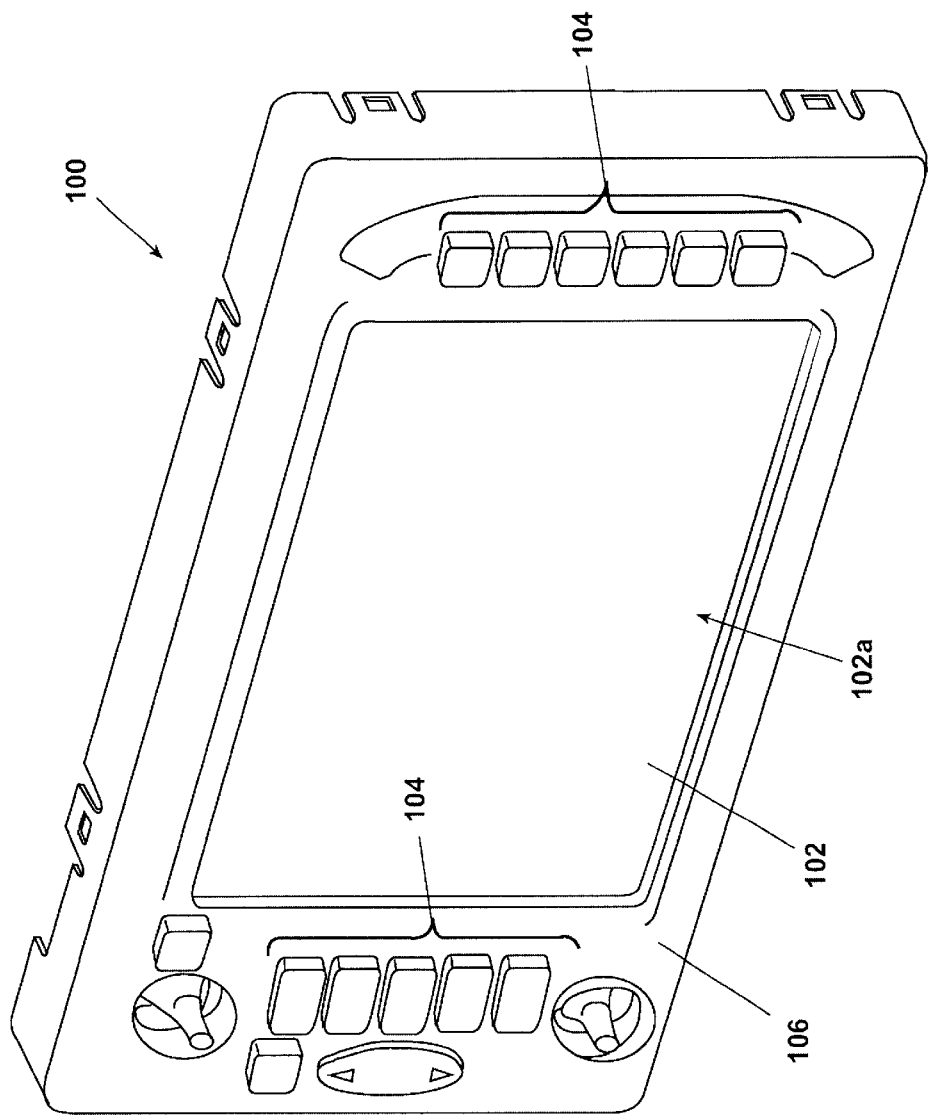
FIG. 1 is a front perspective view of a vehicle display assembly according to one embodiment of the present invention.
Figure 2:
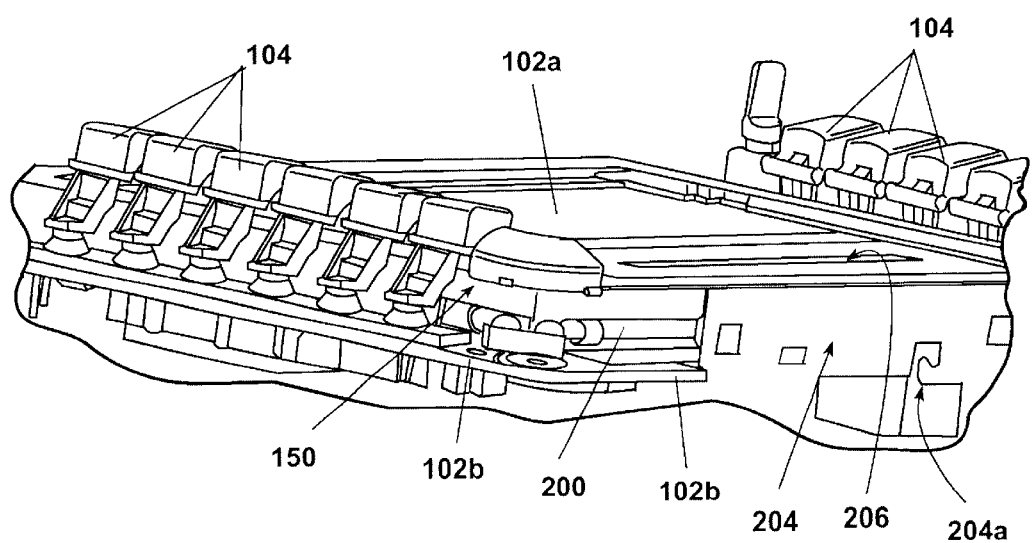
FIG. 2 is a side perspective view of the vehicle display assembly of FIG. 1.

Referring to FIGS. 1 and 2, a display assembly 100 according to one embodiment of the invention includes a display board 102, such as a liquid crystal display (LCD) 102a and its corresponding circuit board 102b, and one or more operating buttons 104. The assembly 100 can have any number and configuration of buttons 104 and display boards 102. A trimplate 106 acts as a cover for the assembly 100 by surrounding the display 102a and the buttons 104 to create an user-pleasing appearance.

The assembly 100 includes a display housing 150 that houses the display board 102 and a light source, such as a fluorescent light tube 200, encased in a lightpipe housing 202. The light tube 200 is normally used for illuminating only the display board 102. The housing 150 also holds a grounding frame 204 that surrounds the light tube 200 and the display board 102. The grounding frame 204 is attached to the display board 102 with tabs 204a or any other attachment structure that can grip the display board 102.

In this embodiment, one light tube 200 is placed on each of the four sides of the 100 to frame the display board 102, but the light tube 200 can be disposed anywhere in the housing 150 and have any configuration as long as the light it generates reaches the display board 102 and buttons 104. A display reflector (not shown) can be mounted in the display board 102 in between the LCD 102a and its corresponding circuit board 102b to reflect light up to the LCD 102a.

Figure 3:
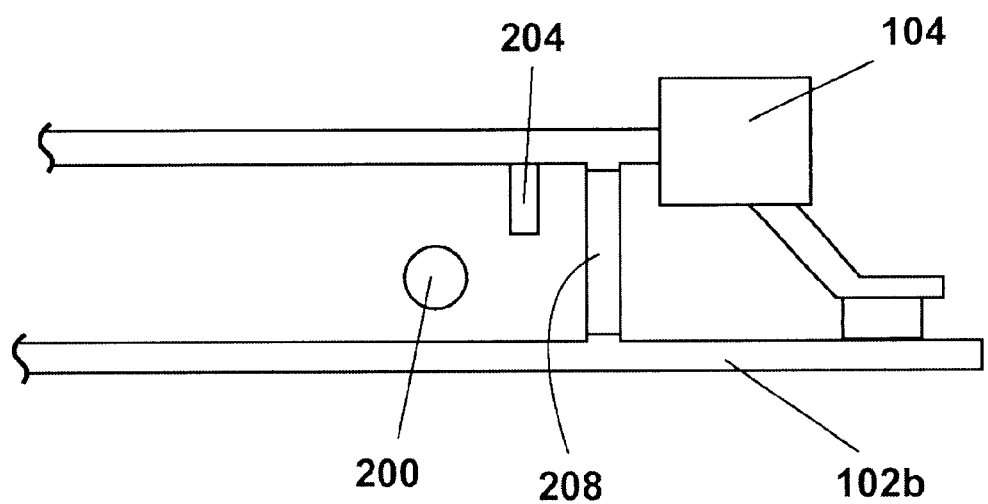
FIG. 3 is a representative side sectional view of a vehicle display assembly according to another embodiment of the invention.

To allow light to reach the buttons, portions of the grounding frame 204 can be removed as shown in FIG. 3. In this embodiment, the sides of the grounding frame 204 facing the buttons 104 are eliminated so that any light generated by the light tube 200 will radiate toward the buttons 104 without the grounding frame 204 blocking the light's path. One or more slots 206 may also be cut into the top of the grounding frame 204 to allow more light to escape toward the top of the assembly 100. These slots may, for example, allow light to reach a CD slot (not shown) cut in the trimplate 106 directly above the slot 206 cut into the grounding frame.

The housing 150 itself may be made of light-transmitting (e.g., clear or translucent) material, such as clear polycarbonate plastic, to allow more light to escape. Alternatively, the sides of the housing 150 can be removed completely to provide light passage, but using light-transmitting material for the housing 150 allows light to radiate outside the housing 150 while still maintaining the shape and structural features of the housing 150. The sides of the display reflector (not shown) may also be removed to expose the light tubes 100 further and allow more light to pass unimpeded to the buttons 104.

The light that escapes the housing 150 illuminates the buttons 104 without the need for any separate button light sources. To vary the colors of the buttons 104, the clear material used in the housing 150 can be tinted, changing the color of the light reaching outside the housing 150 to the buttons 104. If the sides of the housing are removed completely, a tinted film (not shown) can be placed over the housing sides to change the light color to the buttons while leaving the light tubes 200 exposed. Alternatively, or in addition, the buttons 104 themselves can be tinted or dyed to change their color.

In one embodiment, the trimplate 106 and display circuit board 102b can be coated with white-colored material to reflect any stray light from the light tube 200 toward the buttons 104. Further, to control the amount of light reaching the buttons, a light shield 208 made out of, for example, an electrochromic material or similar material can be placed between the light tube 200 and the buttons 104, as requested in FIG. 3. The medium used in the light shield 208 should have a variable light transmission property so that the amount of light to the buttons 104 can be increased, reduced, or eliminated altogether.

If an electrochromic material is used in the light shield 208, the light shield 208 should be connected to an electrical input source (not shown) to control the amount of light passing through the light shield 208. When the electrochromic material in the light shield 208 is in a translucent state, most or all of the light from the light tube 200 can pass through to the buttons 204. If conditions make illuminated buttons undesirable, an electrical input to the light shield 208 changes the state of the electrochromic material from translucent to a semi-opaque or opaque state, effectively reducing or stopping light passage from the light tube 200 to the buttons 104. Because an impulse voltage adjusts the amount of light blocked through the electrochromic material, and because the electrochromic material does not require a constant current to maintain its state, a heat shield 208 made with this material will not produce heat. As a result, the assembly 100 provides variable light output to the buttons without sacrificing the heat reduction offered by reducing the number of light sources.

By eliminating the need for a separate light source to illuminate the radio buttons and CD slot, the inventive structure simplifies manufacturing of the display. Further, because the buttons are lit by excess light from the display board's light source and do not need separate incandescent light sources, the invention reduces the total number of assembly components and simplifies the corresponding circuitry, reducing manufacturing costs. Note that even though the inventive assembly has fewer light sources than previously-known assemblies, using the same source to illuminate both the buttons and the display board does not affect the brightness of the display board itself; instead, the inventive structure simply harnesses light that would have ordinarily been blocked by the display housing 150 and/or the grounding frame 204.

Also, because the inventive system uses a limited number of light sources, any thermal protection algorithm used to control the temperature of the assembly 100 only needs to regulate the light from the light tube 102 CD and not multiple light sources. In fact, because the same structure illuminates both the display board 102a and the buttons 104, the reduced number of light sources may eliminate the need for any separate cooling or temperature control mechanism altogether. In some experimental results comparing assemblies having separate incandescent light sources for the buttons 104 and the inventive assembly 100, the inventive assembly 100 generates around 8.5W less heat and can reduce the assembly's operating temperature by 20° C.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A vehicle display assembly, comprising:
   a display board;
   a light source for illuminating the display board;
   a grounding frame containing the display board and the light source; and
   at least one button disposed outside the grounding frame, wherein the grounding frame is configured to allow light from the light source to illuminate said at least one button.

2. The assembly of claim 1, wherein the grounding frame is formed without at least one side to allow light passage from the light source.

3. The assembly of claim 2, further comprising at least one opening in a top surface of the grounding frame to allow light passage from the light source.

4. The assembly of claim 1, further comprising a display housing for housing the display board and the light source, wherein said at least one button is disposed outside of the display housing.

5. The assembly of claim 4, wherein the display housing is formed without at least one side.

6. The assembly of claim 5, further comprising a colored film disposed between the light source and said at least one button to change a color of the light illuminating said at least one button.

7. The assembly of claim 4, wherein the display housing has at least one side made of a light-transmitting material.

8. The assembly of claim 7, wherein at least a portion of the light-transmitting material is colored to change a color of the light illuminating said at least one button.

9. The assembly of claim 1, further comprising a light shield disposed between the light source and said at least one button, the light shield having a variable light transmission property to vary the amount of light reaching said at least one button.

10. The assembly of claim 9, wherein the light shield includes an electrochromic material to provide the variable light transmission property.

* * * * *